United States Patent
Senzaki et al.

(10) Patent No.: US 10,042,612 B2
(45) Date of Patent: Aug. 7, 2018

(54) SOFTWARE DEVELOPMENT SUPPORT APPARATUS, SOFTWARE DEVELOPMENT SUPPORT METHOD, AND COMPUTER READABLE MEDIUM

(71) Applicant: MITSUBISHI ELECTRIC CORPORATION, Chiyoda-ku, Tokyo (JP)

(72) Inventors: Takeo Senzaki, Tokyo (JP); Kiyohisa Kondo, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/171,612

(22) Filed: Jun. 2, 2016

(65) Prior Publication Data

US 2017/0161024 A1 Jun. 8, 2017

(30) Foreign Application Priority Data

Dec. 2, 2015 (JP) .................................. 2015-236026

(51) Int. Cl.
*G06F 9/44* (2018.01)
*G06F 8/20* (2018.01)
*G06F 8/30* (2018.01)

(52) U.S. Cl.
CPC . *G06F 8/20* (2013.01); *G06F 8/30* (2013.01)

(58) Field of Classification Search
None
See application file for complete search history.

(56) References Cited

U.S. PATENT DOCUMENTS

2009/0158218 A1* 6/2009 Brooks ............. G06F 17/30392
715/854

FOREIGN PATENT DOCUMENTS

| JP | 2008-192059 A | 8/2008 |
|---|---|---|
| JP | 2010-067214 A | 3/2010 |
| JP | 2010-271866 A | 12/2010 |
| JP | 2011-253345 A | 12/2011 |
| JP | 2012-103884 A | 5/2012 |
| JP | 2012-164232 A | 8/2012 |
| JP | 5029047 B2 | 9/2012 |
| JP | 2013-003715 A | 1/2013 |
| JP | 5247587 B2 | 7/2013 |

(Continued)

OTHER PUBLICATIONS

Canadian Office Action dated Dec. 28, 2017 in corresponding Canadian Patent Application 2,929,625.

*Primary Examiner* — Qamrun Nahar
(74) *Attorney, Agent, or Firm* — Buchanan Ingersoll & Rooney PC

(57) ABSTRACT

The present invention aims to prevent an oversight in an association between items in a deliverable, and to detect an error in the association early. An item designation unit designates a plurality of items to be included in a generation target deliverable, before generation of the generation target deliverable being a deliverable to be generated. An item association unit associates, before generation of the generation target deliverable, a plurality of high-order items included in a high-order deliverable with the plurality of designated items designated by the item designation unit. The high-order deliverable is a deliverable of a higher stage than a stage to which the generation target deliverable corresponds.

12 Claims, 5 Drawing Sheets

(56) References Cited

FOREIGN PATENT DOCUMENTS

| JP | 5264866 B2 | 8/2013 |
| JP | 5355497 B2 | 11/2013 |
| JP | 5449506 B1 | 3/2014 |
| JP | 5456707 B2 | 4/2014 |
| JP | 2014-092976 A | 5/2014 |
| JP | 2014-232505 A | 12/2014 |

* cited by examiner

SOFTWARE DEVELOPMENT SUPPORT APPARATUS, SOFTWARE DEVELOPMENT SUPPORT METHOD, AND COMPUTER READABLE MEDIUM

CROSS-REFERENCE TO RELATED APPLICATIONS

This application is based on and claims the benefit of priority from Japanese Patent Application No. 2015-236026, filed in Japan on Dec. 2, 2015, the content of which is incorporated herein by reference in its entirety.

TECHNICAL FIELD

The present invention relates to technology that supports generation of a design deliverable (hereinafter, may also be called simply a deliverable) of software development.

BACKGROUND ART

Currently, various methods are used to ensure traceability between design deliverables of work phases in design work of software development.

For example, a method is used in which traceability information indicating in a table format, a corresponding relationship between design deliverables, is generated and managed by using a tool such as a spreadsheet application.

A method is used in which traceability information indicating a corresponding relationship between design deliverables, is generated and managed by a dedicated tool.

By the methods above, traceability information indicating a corresponding relationship between design deliverables such as a document and a source code, may be generated.

Further, by the methods above, traceability information indicating a corresponding relationship between items such as a text, a diagram, a table, a class, a function, and a test case, in a deliverable, may be generated.

A method for automatically generating traceability information is disclosed in Patent Literature 1.

CITATION LIST

Patent Literature

[Patent Literature 1] JP 2011-253345 A

SUMMARY OF INVENTION

Technical Problem

In the generation method of the traceability information that uses a tool such as the spreadsheet application or the dedicated tool, however, a generator (a user) of a deliverable generates traceability information by manually checking a relationship between items of a deliverable or a relationship between deliverables, after the deliverable is generated.

For the above reason, there is a problem that an oversight in an association occurs at the time of generating the traceability information.

In addition, an error can only be detected at a review even when there is an error of an oversight in the association in the traceability information, or an error of insufficient description in the traceability information.

As described above, the conventional generation method of traceability information has a problem that an error may not be corrected sufficiently.

Furthermore, an automatic generation method of traceability information as in Patent Literature 1 has a problem that an error of traceability information cannot be detected unless the generator of the deliverable checks the traceability information at a review.

The present invention mainly aims to solve such a problem described above. That is, the present invention mainly aims to prevent an oversight in the association between items in a deliverable, and to detect an error in the association early.

Solution to Problem

A software development support apparatus according to the present invention which supports generation of a deliverable of software development, the software development support apparatus includes:

an item designation unit to designate, before generation of a generation target deliverable being a deliverable to be generated, a plurality of items to be included in the generation target deliverable; and an item association unit to associate, before generation of the generation target deliverable, a plurality of high-order items included in a high-order deliverable with the plurality of designated items designated by the item designation unit, the high-order deliverable being a deliverable of a higher stage than a stage to which the generation target deliverable corresponds.

Advantageous Effects of Invention

The present invention designates a plurality of items to be included in a generation target deliverable, and associates a plurality of high-order items included in a high-order deliverable with the plurality of designated items of the generation target deliverable, before generation of the generation target deliverable.

Therefore, the present application may prevent an oversight in an association between items within a deliverable, and detect an error in the association early.

BRIEF DESCRIPTION OF DRAWINGS

The present invention will become fully understood from the detailed description given hereinafter in conjunction with the accompanying drawings, in which.

DESCRIPTION OF EMBODIMENTS

Figure 1:
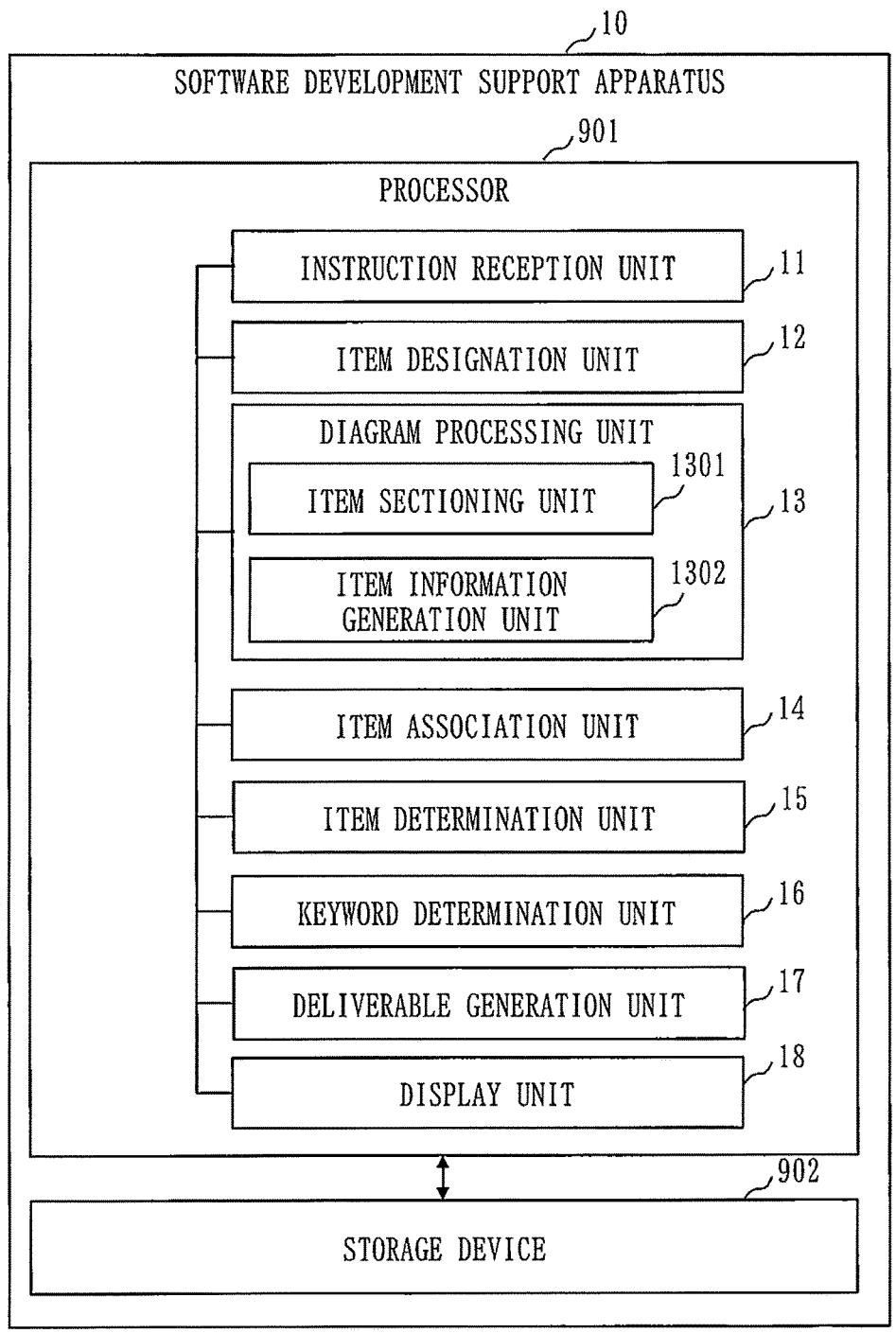
FIG. 1 is a diagram illustrating an example of a configuration of a software development support apparatus according to a first embodiment.

In describing preferred embodiments illustrated in the drawings, specific terminology is employed for the sake of clarity. However, the disclosure of the present invention is not intended to be limited to the specific terminology so selected, and it is to be understood that each specific element includes all technical equivalents that operate in a similar manner and achieve a similar result.

Embodiment 1

*Description on Configuration*

FIG. 1 illustrates an example of a configuration of a software development support apparatus 10 according to the present embodiment.

The software development support apparatus 10 is a computer that supports generation of a deliverable of software development.

More specifically, the software development support apparatus 10 generates traceability information indicating a corresponding relationship between deliverables generated in each stage of a software development process.

The software development support apparatus 10 includes a processor 901 and a storage device 902 as hardware.

The software development support apparatus 10 includes, as a functional configuration, an instruction reception unit 11, an item designation unit 12, a diagram processing unit 13, item association unit 14, an item determination unit 15, a keyword determination unit 16, a deliverable generation unit 17, and a display unit 18.

The storage device 902 stores programs that implement functions of the instruction reception unit 11, the item designation unit 12, the diagram processing unit 13, the item association unit 14, the item determination unit 15, the keyword determination unit 16, the deliverable generation unit 17, and the display unit 18.

The processor 901 executes these programs and carries out operations of the instruction reception unit 11, the item designation unit 12, the diagram processing unit 13, the item association unit 14, the item determination unit 15, the keyword determination unit 16, the deliverable generation unit 17, and the display unit 18, which will be described later.

Figure 3:
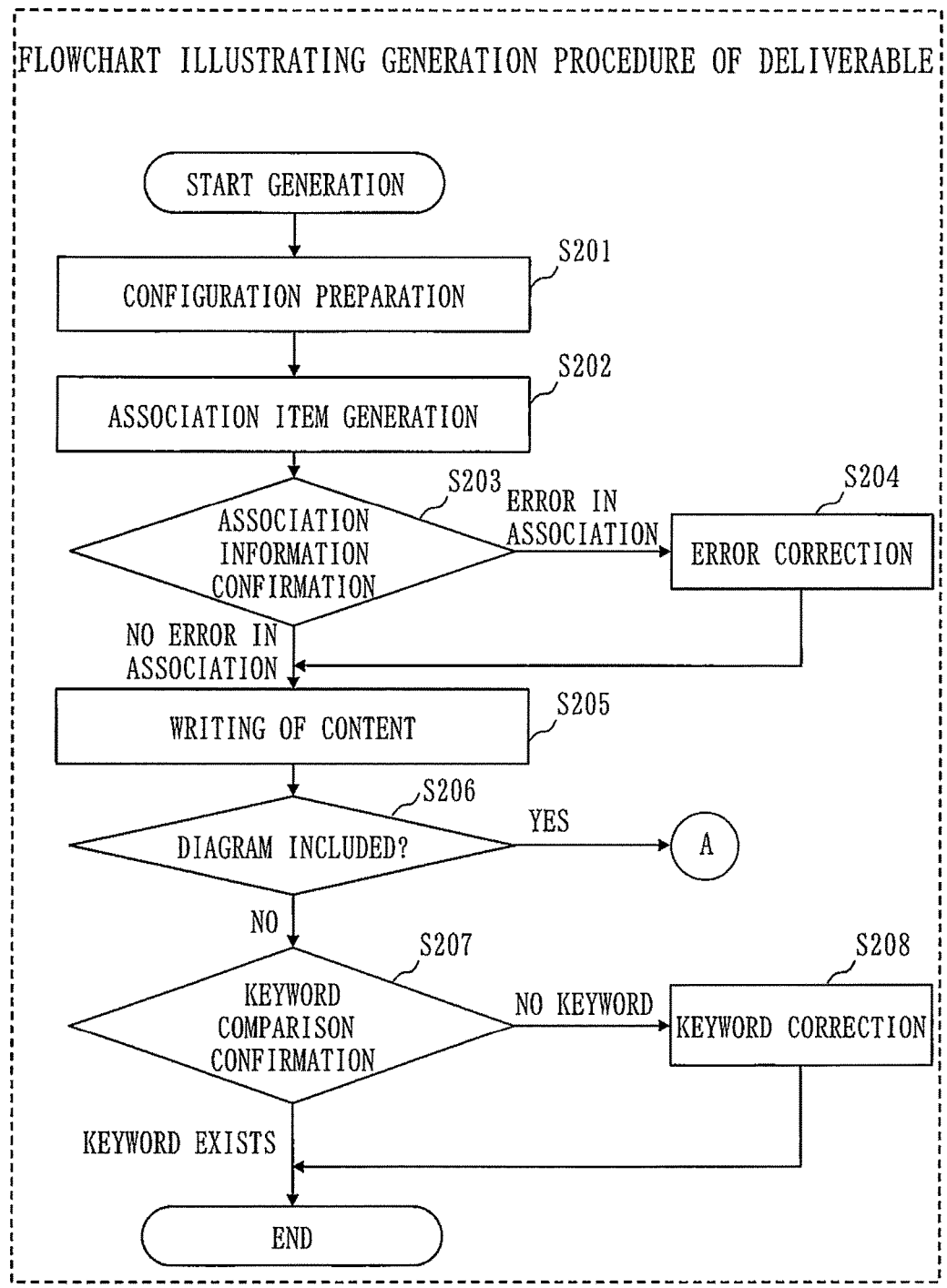
FIG. 3 is a flowchart illustrating a generation procedure of a deliverable according to the first embodiment.

FIG. 3 schematically illustrates a state in which the processor 901 executes the programs that implement functions of the instruction reception unit 11, the item designation unit 12, the diagram processing unit 13, the item association unit 14, the item determination unit 15, the keyword determination unit 16, the deliverable generation unit 17, and the display unit 18.

*Description on Operation*

The instruction reception unit 11 receives an instruction from a user (a generator of the deliverable) of the software development support apparatus 10.

The item designation unit 12 designates, before generation of a generation target deliverable, which is a deliverable to be generated, a plurality of items to be included in the generation target deliverable.

A processing performed by the item designation unit 12 corresponds to designating.

If a diagram is included in the generation target deliverable, the diagram processing unit 13 performs processing on the diagram.

The diagram processing unit 13 is configured of an item sectioning unit 1301 and an item information generation unit 1302.

The item sectioning unit 1301 sections the diagram into a plurality of items.

The item information generation unit 1302 generates item information which indicates an attribute of an item, for each item obtained by sectioning of the item sectioning unit 1301.

Processing performed by the item sectioning unit 1301 corresponds to sectioning, and processing performed by the item information generation unit 1302 corresponds to generating.

The item association unit 14 associates, before generation of the generation target deliverable, a plurality of high-order items included in a high-order deliverable with a plurality of designated items designated by the item designation unit 12. The high-order deliverable is a deliverable of a higher stage than a stage to which the generation target deliverable corresponds.

If a diagram is included in the generation target deliverable, the item association unit 14 associates any item included in the high-order deliverable with the item information of any item of the diagram.

The processing performed by the item association unit 14 corresponds to associating.

The item determination unit 15 determines, before the generation of the generation target deliverable, whether or not each of the plurality of high-order items is associated with any one of the plurality of designated items.

If a diagram is included in the generation target deliverable, the item determination unit 15 determines whether or not each of the plurality of items of the diagram is associated with any one of the items of the high-order deliverable.

The keyword determination unit 16 determines, for each high-order item, after the generation target deliverable is generated, whether or not a keyword written in the high-order item is written in the designated item associated with the high-order item.

The deliverable generation unit 17 generates a deliverable according to the instruction from the user.

The display unit 18 outputs various types of information to a display apparatus (not illustrated in FIG. 1) and shows the various types of information to the user of the software development support apparatus 10.

The display unit 18, for example, shows a determination result of the item determination unit 15 and a determination result of the keyword determination unit 16, to the user of the software development support apparatus 10.

Figure 2:
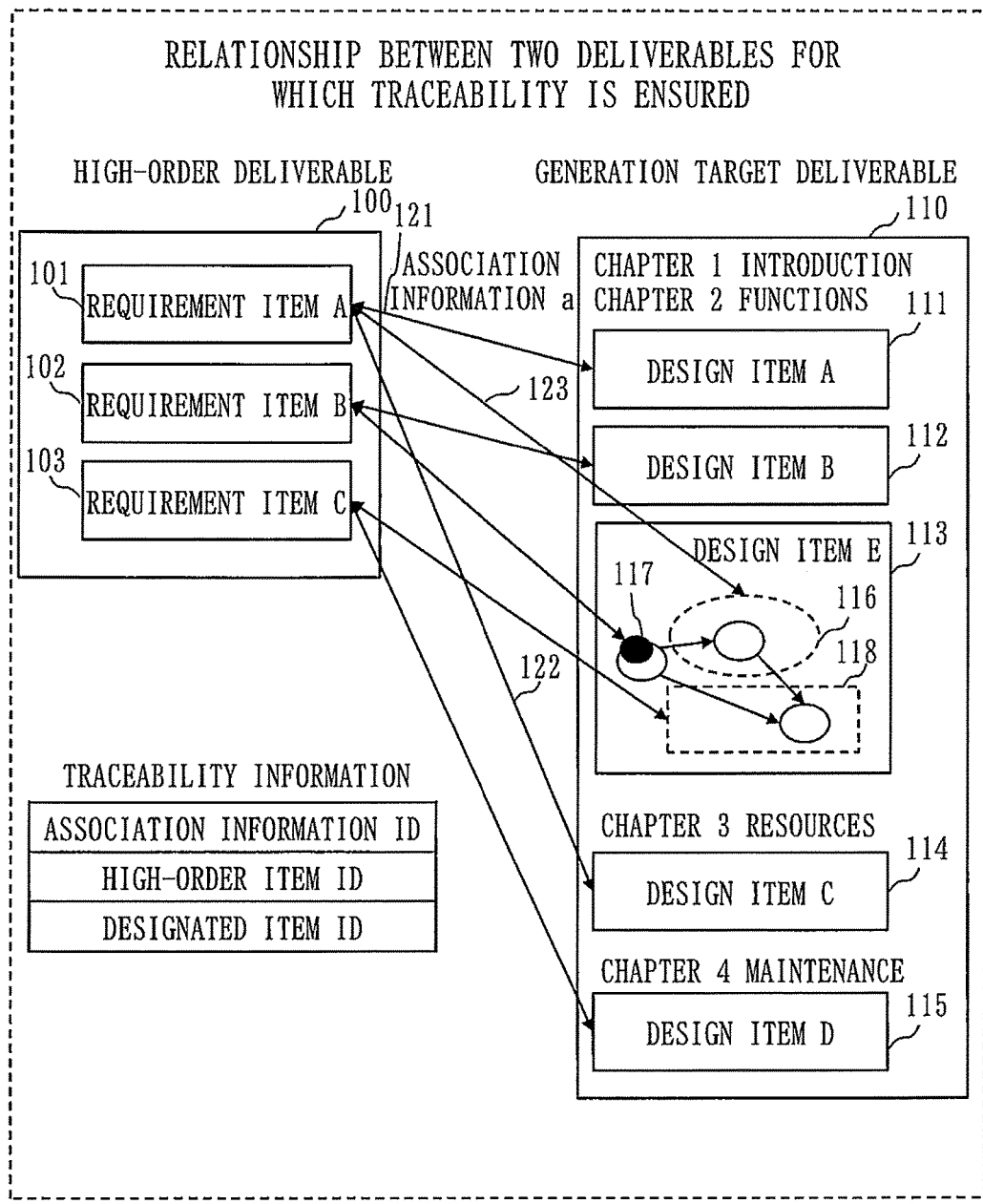
FIG. 2 is a diagram illustrating a relationship between two deliverables for which traceability is ensured according to the first embodiment.

FIG. 2 illustrates a relationship between two deliverables for which traceability is ensured.

FIG. 2 illustrates a corresponding relationship between an item included in a high-order deliverable 100 and an item included in a generation target deliverable 110.

In the example of FIG. 2, the high-order deliverable 100 is a requirement specification, and the generation target deliverable 110 is a design document.

The high-order deliverable 100 includes, as high-order items, a requirement item A101, a requirement item B102, and a requirement item C103.

The generation target deliverable 110 includes, as designated items, a design item A111, a design item B112, a diagram 113 which is a design item E, a design item C114, and a design item D115.

Items 116 through 118 are included in the diagram 113.

Arrows connecting the high-order items of the high-order deliverable 100 and the designated items of the generation target deliverable 110 indicate association between items.

For example, in FIG. 2, as indicated with reference signs 121, 122, and 123, arrows are depicted between the requirement item A101 and the design item A111, between the requirement item A101 and the item 116 in the diagram 113, and between the requirement item A101 and the design item C114, indicating that these items are associated.

The software development support apparatus 10 generates the traceability information indicating the association between the items.

The traceability information is configured of an association information ID (Identifier), a high-order item ID, and a designated item ID.

The association information ID is identification information of an association between items.

The high-order item ID is identification information of high-order items that are associated.

The designated item ID is identification information of designated items that are associated.

For example, in the association between items indicated by the reference sign 121, the software development support apparatus 10 generates traceability information where "association information a", "requirement item A", and "design item A" are corresponding to each other.

Next, an example of operation of the software development support apparatus 10 according to the present embodiment will be described in reference to a flowchart of FIG. 3.

A processing procedure illustrated in the flowchart of FIG. 3 corresponds to an example of a software development support method and a software development support program.

First, at configuration preparation (S201), the deliverable generation unit 17 reads out a template which represents a configuration of the generation target deliverable 110, from the storage device 902.

The template that the deliverable generation unit 17 reads out is a template of a deliverable that corresponds to a stage subsequent to a stage to which the high-order deliverable 100 corresponds.

Specifically, the template corresponds to a state obtained by removing the design item A111, the design item B112, the diagram 113, the design item C114, and the design item D115 from the generation target deliverable 110 of FIG. 2.

The deliverable generation unit 17 stores the template read out in, for example, a register in the processor 901.

Next, at association item generation (S202), the instruction reception unit 11 receives the instruction from the user, and designates a plurality of items to be included in the generation target deliverable 110.

In the example of FIG. 2, the instruction reception unit 11 adds the design item A111, the design item B112, the diagram 113, the design item C114, and the design item D115 to the template read out at S201, as the designated items required to be written in the generation target deliverable 110, based on the instruction from the user.

In other words, the instruction reception unit 11 sets to the register in the processor 901, an area for each designated item.

At this point, nothing is written in each of the design item A111, the design item B112, the diagram 113, the design item C114, and the design item D115.

Then, the item association unit 14 obtains the instruction from the user via the instruction reception unit 11, and associates the designated items of the generation target deliverable 110 with all of the high-order items of the high-order deliverable 100, according to the instruction from the user.

In the example of FIG. 2, the item association unit 14 associates the design item A111 and the design item C114 with the requirement item A101, and generates traceability information representing the association.

The item association unit 14 associates the design item B112 with the requirement item B102, and generates traceability information representing the association.

The item association unit 14 associates the design item D115 with the requirement item C103, and generates traceability information representing the association.

In other words, the item association unit 14 stores the traceability information in the register in the processor 901.

In the example of FIG. 2, the requirement item A101 is associated with the item 116 of the diagram 113, the requirement item B102 is associated with the item 117 of the diagram 113, and the requirement item C103 is associated with the item 118 of the diagram 113.

At this point, however, since an inside of the diagram 113 is not yet generated, the association of the requirement item A101 with the item 116 of the diagram 113, the association of the requirement item B102 with the item 117 of the diagram 113, and the association of the requirement item C103 with the item 118 of the diagram 113 are not yet performed.

Next, at association information confirmation (S203), the item determination unit 15 determines whether or not each high-order item is associated with any one of the designated items.

In other words, the item determination unit 15 determines whether or not all of the requirement item A101, the requirement item B102, and the requirement item C103 being the high-order items of the high-order deliverable 100 are associated with any one of the designated items.

If there is a high-order item with which none of the designated items are associated, the item determination unit 15 determines that there is an error in the association, and the processing proceeds to S204.

If there are many associations with any of the high-order items, for example, if the number of associations are equal to or more than a specified value, the item determination unit 15 may also determine that there is an error in the association.

In this case as well, the processing proceeds to S204.

If there is an error in the association, the display unit 18 notifies the user of an error in the association at error correction (S204), and the user corrects the error in the association.

In other words, the item association unit 14 obtains via the instruction reception unit 11, an instruction on corrected association, corrects the association between the high-order items and the designated items according to the instruction, and generates new traceability information.

In this case as well, the item association unit 14 stores the new traceability information in the register in the processor 901.

If there is no error in the association, the deliverable generation unit 17 adds design content to each designated item in the generation target deliverable 110 according to the instruction from the user, and generates the generation target deliverable 110 at writing of content (S205).

More specifically, the deliverable generation unit 17 obtains the design content of each designated item from the user via the instruction reception unit 11, and adds the design content to each designated item.

In other words, the deliverable generation unit 17 stores information of the design content in the register in the processor 901.

Next, the deliverable generation unit 17 determines whether or not a diagram is included in the generation target deliverable 110 (S206).

If a diagram is not included in the generation target deliverable 110, the processing proceeds to S207.

Figure 5:
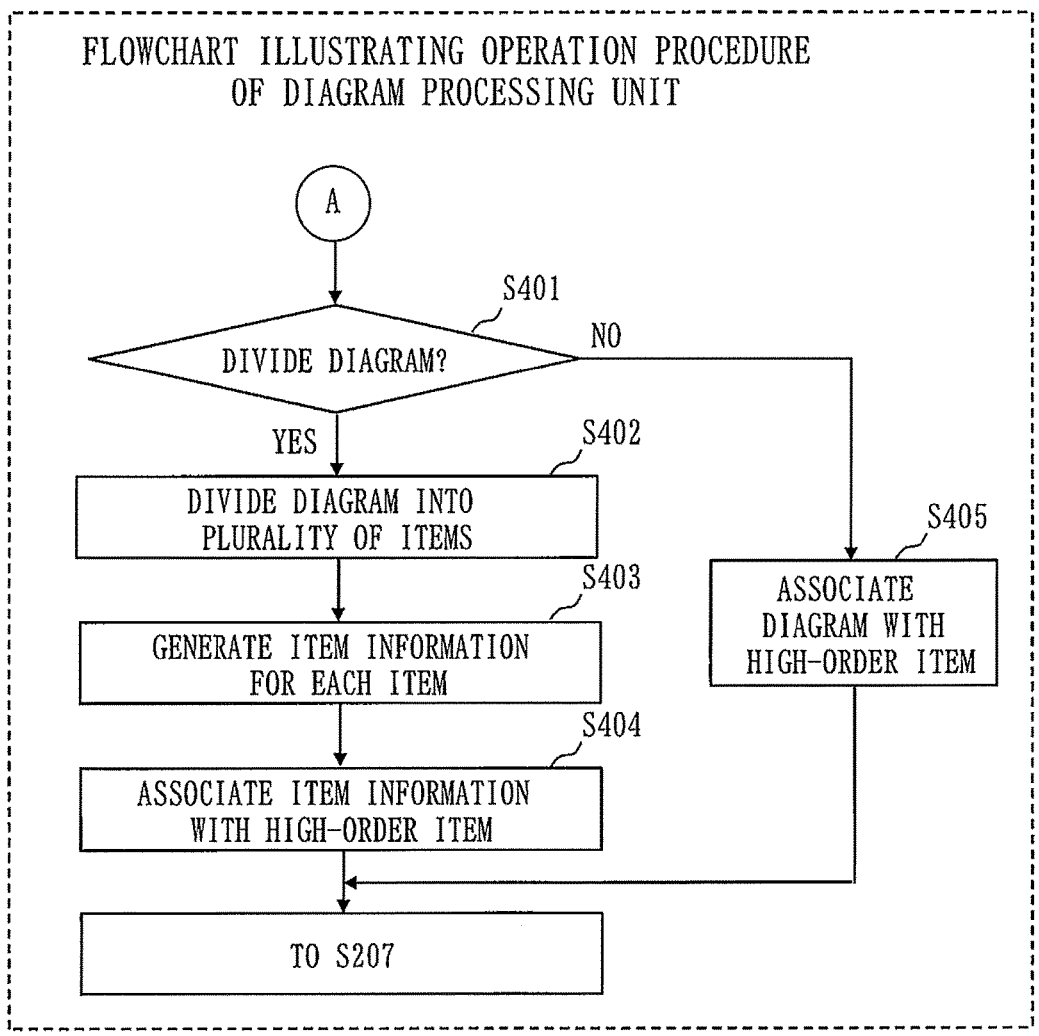
FIG. 5 is a flowchart illustrating an operation procedure of a diagram processing unit according to the first embodiment.

On the other hand, if a diagram is included in the generation target deliverable 110, the processing proceeds to S401 illustrated in FIG. 5.

Details of FIG. 5 which includes S401 will be described later.

At keyword comparison confirmation (S207), the keyword determination unit 16 determines, for each high-order item, whether or not the keyword written in the high-order item is written in the designated item associated with the high-order item.

The instruction reception unit 11 obtains the keyword from the user, for each high-order item.

In other words, the keyword determination unit 16 determines whether or not the keyword that the user designated via the instruction reception unit 11 for each high-order item is included in the designated item that is associated.

If the keyword of the high-order item is not written in the designated item at S207, the deliverable generation unit 17 corrects the design content of the designated item concerned according to the instruction from the user at keyword correction (S208).

More specifically, the display unit 18 notifies the user of the keyword and the designated item in which the keyword is not written.

Then, the deliverable generation unit 17 obtains the corrected design content (the design content in which the keyword is included) from the user via the instruction reception unit 11, and adds the corrected design content to the designated item concerned.

In other words, the deliverable generation unit 17 stores information of the corrected design content in the register in the processor 901.

A deliverable for which traceability is ensured is generated by the procedure mentioned above.

Next, processing when it is determined at S206 of FIG. 3 that a diagram is included in the generation target deliverable 110, will be described by referring to FIG. 4 and FIG. 5.

Figure 4:
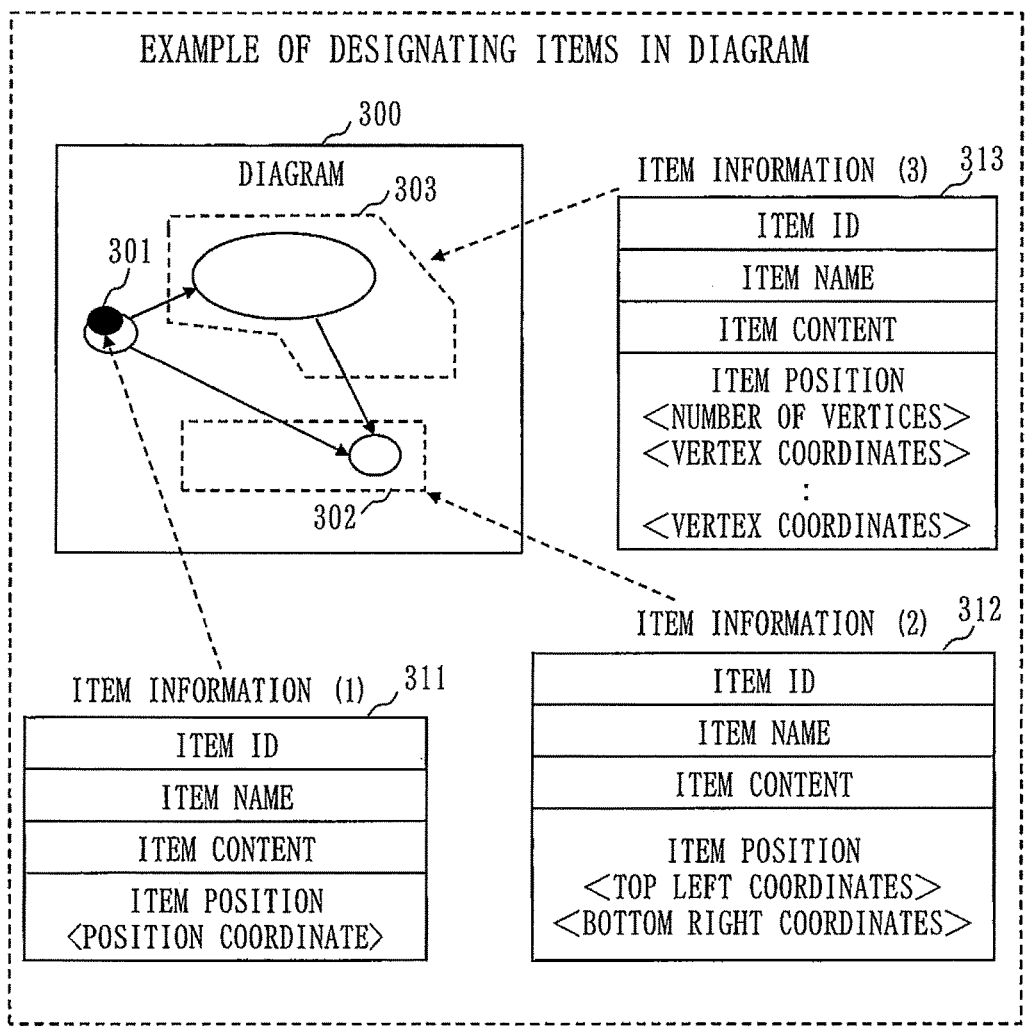
FIG. 4 is a diagram illustrating an example of designating items in a diagram according to the first embodiment.

FIG. 4 illustrates a division example of a diagram included in the generation target deliverable 110.

FIG. 5 illustrates an example of operation of the software development support apparatus 10 when a diagram is included in the generation target deliverable 110.

An operation procedure illustrated in a flowchart of FIG. 5 corresponds to examples of the software development support method and the software development support program.

If a diagram is included in the generation target deliverable 110, the user instructs the instruction reception unit 11 whether or not to divide the diagram.

If the diagram included in the generation target deliverable 110 is to be divided (YES at S401), a processing of S402 is performed, and if the diagram is not to be divided (NO at S401), a processing of S405 is performed.

If the diagram is to be divided, the item sectioning unit 1301 of the diagram processing unit 13 divides the diagram into a plurality of items (S402).

More specifically, the item sectioning unit 1301 divides the diagram into areas designated by the user via the instruction reception unit 11, and generates the plurality of items.

For example, the user sections a diagram 300 by designating a rectangular area or a polygonal area in the diagram 300, as illustrated in FIG. 4.

The item sectioning unit 1301 divides elements of the diagram 300 into an item 301, an item 302, and an item 303, according to the instruction from the user.

Next, the item information generation unit 1302 generates item information for each item (S403).

The item information is configured of an item ID, an item name, and an item position, as illustrated in FIG. 4.

The item information generation unit 1302 sets the item ID to each item.

The item information generation unit 1302 obtains, as item content, item name and the like from the user via the instruction reception unit 11.

The item information generation unit 1302 generates the item position which is position information that specifies an area of each item designated at S402.

In the example of FIG. 4, since the item 301 is a point area, the item position of the item 301 is, for example, coordinates of the point (a position coordinate).

Since the item 302 is the rectangular area, the item position of the item 302 is, for example, coordinates of two opposite vertices of the rectangle (top left coordinates and bottom right coordinates). The item position of the item 302 may be top right coordinates and bottom left coordinates.

Since the item 303 is the polygonal area, the item position of the item 303 is, for example, number of vertices and vertex coordinates of the polygon.

The item information generation unit 1302 generates, for each item, the item information by combining the item ID, the item content, and the item position.

Next, the item association unit 14 associates the item information of each item included in the diagram with the high-order items of the high-order deliverable 100 (S404).

More specifically, the item association unit 14 obtains the instruction from the user via the instruction reception unit 11, associates the item information of each item included in the diagram with any one of the high-order items according to the instruction from the user, and generates traceability information.

In the traceability information which is generated here, the ID written in the item ID of the item information of FIG. 4 is written into a field of the designated item ID of FIG. 2.

The item association unit 14 stores the traceability information that has been generated in the register in the processor 901.

On the other hand, if the diagram is not to be divided at S401, the item association unit 14 associates the diagram included in the generation target deliverable 110 with any one of the high-order items of the high-order deliverable (S405).

More specifically, the item association unit 14 obtains the instruction from the user via the instruction reception unit 11, and according to the instruction from the user, associates the diagram with any one of the high-order items, and generates traceability information.

In the traceability information which has been generated, the ID of the diagram is written into the field of the designated item ID of FIG. 2.

The item association unit 14 stores the traceability information that has been generated in the register in the processor 901.

After S404 or S405 has been implemented, S207 of FIG. 3 is implemented.

In FIG. 2, a description has been given using an example of generating the design document from the requirement specification. If a source program is to be generated from the design document, it is possible to generate traceability information between the design document and the source program with the same procedure by replacing the requirement item of FIG. 2 with the design item and by replacing the design item of FIG. 2 with a function or the like.

When a test specification is to be generated from the design document, it is also possible to generate traceability information between the design document and the test specification with the same procedure by replacing the requirement item of FIG. 2 with the design item and by replacing the design item of FIG. 2 with a test item.

Description on Effects of Embodiment

In the present embodiment, a plurality of items to be included in a generation target deliverable is designated before generation of the generation target deliverable, and a plurality of high-order items included in a high-order deliverable is associated with a plurality of designated items of the generation target deliverable.

In the present embodiment, it is determined whether or not each of the plurality of high-order items is associated with any one of the plurality of designated items, before generation of the generation target deliverable.

For the reason above, according to the present embodiment, an oversight in an association between items of a deliverable may be prevented, and an error in the association may be detected early.

In the present embodiment, for each high-order item, it is determined whether or not a keyword written in the high-order item is written in the designated item associated with the high-order item, after generation of the generation target deliverable.

For the reason above, it may be determined whether or not content of the high-order item is appropriately reflected in the designated item.

In the present embodiment, a diagram included in the generation target deliverable is sectioned into a plurality of items, and item information indicating an attribute of the item for each item is generated.

Furthermore, in the present embodiment, any one of the high-order item included in the high-order deliverable is associated with the item information of any one of the items in the diagram.

Conventionally, since the diagram as a whole has been handled as one item, only an association between the high-order item and the whole diagram has been indicated in traceability information.

Contrarily, since the high-order items and the items in the diagram are associated in the traceability information according to the present embodiment, the item in the diagram to which the high-order item is reflected becomes noticeable.

*Description on Hardware Configuration*

Finally, a supplemental explanation of a hardware configuration of the software development support apparatus 10 will be given.

The processor 901 illustrated in FIG. 1 is an IC (Integrated Circuit) which performs processing.

The processor 901 is a CPU (Central Processing Unit), a DSP (Digital Signal Processor), and the like.

The storage device 902 illustrated in FIG. 1 is a RAM (Random Access Memory), a ROM (Read Only Memory), a flash memory, an HDD (Hard Disk Drive), and the like.

An OS (Operating System) is also stored in the storage device 902.

At least a part of the OS is executed by the processor 901.

The processor 901 executes programs which implement functions of the instruction reception unit 11, the item designation unit 12, the diagram processing unit 13, the item association unit 14, the item determination unit 15, the keyword determination unit 16, the deliverable generation unit 17, and the display unit 18 (hereinafter will be collectively called "unit") while executing at least a part of the OS.

In FIG. 1, only one processor is illustrated, but the software development support apparatus 10 may include a plurality of processors.

Information, data, signal values, and variable values indicating the results of processing of "unit" are stored in the storage device 902 or in the register or a cache memory in the processor 901.

The programs that implement functions of "unit" may be stored in a portable storage medium such as a magnetic disk, a flexible disk, an optical disc, a compact disc, a Blu-ray (registered trademark) Disc, or a DVD.

"Unit" may also be read as "circuit", "process", "procedure", or "processing".

The software development support apparatus 10 may also be implemented by an electronic circuit such as a logic IC (Integrated Circuit), a GA (Gate Array), an ASIC (Application Specific Integrated Circuit), and an FPGA (Field-Programmable Gate Array).

In such a case, each "unit" is implemented as a part of the electronic circuit.

The processor and the electronic circuit described above are also referred to as a processing circuitry.

Numerous additional modifications and variations are possible in light of the above teachings. It is therefore to be understood that, within the scope of the appended claims, the disclosure of this patent specification may be practiced otherwise than as specifically described herein.

REFERENCE SIGNS LIST

10: software development support apparatus, 11: instruction reception unit, 12: item designation unit, 13: diagram processing unit, 1301: item sectioning unit, 1302: item information generation unit, 14: item association unit, 15: item determination unit, 16: keyword determination unit, 17: deliverable generation unit, 18: display unit, 100: high-order deliverable, 101: requirement item A, 102: requirement item B, 103: requirement item C, 110: generation target deliverable, 111: design item A, 112: design item B, 113: diagram, 114: design item C, 115: design item D, 116: item, 117: item, 118: item, 901: processor, 902: storage device

The invention claimed is:

1. A software development support apparatus which supports generation of a deliverable of software development, the software development support apparatus comprising:
   processing circuitry to designate, before generation of a generation target deliverable being a deliverable to be generated, a plurality of items to be included in the generation target deliverable; and
   to associate, before generation of the generation target deliverable, a plurality of high-order items included in a high-order deliverable with the plurality of designated items designated, the high-order deliverable being a deliverable of a higher stage than a state to which the generation target deliverable corresponds.

2. The software development support apparatus according to claim 1, wherein
   the processing circuitry further determines, before the generation of the generation target deliverable, whether or not each of the plurality of high-order items is associated with any one of the plurality of designated items.

3. The software development support apparatus according to claim 1, wherein the processing circuitry further determines, for each high-order item, after the generation target deliverable is generated, whether or not a keyword written in the high-order item is written in the designated item associated with the high-order item.

4. A software development support apparatus which supports generation of a deliverable of software development, the software development support apparatus comprising:

processing circuitry to section a diagram included in the deliverable into a plurality of items; and to generate item information which indicates an attribute of an item, for each item obtained, wherein the processing circuitry further associates any one of the items included in a high-order deliverable with the item information of any one of the items in the diagram, the high-order deliverable being a deliverable of a higher stage than a stage to which the deliverable including the diagram corresponds.

5. A software development support method which supports generation of a deliverable of software development, the software development support method comprising:

designating, before generation of a generation target deliverable being a deliverable to be generated, a plurality of items to be included in the generation target deliverable; and associating, before generation of the generation target deliverable, a plurality of high-order items included in a high-order deliverable with the plurality of designated items designated, the high-order deliverable being a deliverable of a higher stage than a stage to which the generation target deliverable corresponds.

6. A software development support method which supports generation of a deliverable of software development, the software development support method comprising:

sectioning a diagram included in the deliverable into a plurality of items;

generating item information which indicates an attribute of an item, for each item obtained by the sectioning, and associating the item information generated with a corresponding item; and associating any one of the items included in a high-order deliverable with the item information of any one of the plurality of items in the diagram, the high-order deliverable being a deliverable of a higher stage than a stage to which the deliverable including the diagram corresponds.

7. A non-transitory computer readable medium storing a software development support program to cause a computer which supports generation of a deliverable of software development, to execute:

designating, before generation of a generation target deliverable being a deliverable to be generated, a plurality of items to be included in the generation target deliverable; and associating, before generation of the generation target deliverable, a plurality of high-order items included in a high-order deliverable with the plurality of designated items designated, the high-order deliverable being a deliverable of a higher stage than a stage to which the generation target deliverable corresponds.

8. A non-transitory computer readable medium storing a software development support program to cause a computer which supports generation of a deliverable of software development, to execute:

sectioning a diagram included in the deliverable into a plurality of items;

generating item information which indicates an attribute of an item, for each item obtained by the sectioning, and associating the item information generated with a corresponding item; and associating any one of the items included in a high-order deliverable with the item information of any one of the plurality of items in the diagram, the high-order deliverable being a deliverable of a higher stage than a stage to which the deliverable including the diagram corresponds.

9. The software development support apparatus according to claim 1, wherein the generation target deliverable is a design product of software development.

10. The software development support apparatus according to claim 1, wherein the generation target deliverable is a design document related to software development.

11. The software development support apparatus according to claim 1, wherein the generation target deliverable is source code related to software development.

12. The software development support apparatus according to claim 1, wherein the generation target deliverable is a design document related to a software development, and the high-order deliverable is source code related to the software development.

* * * * *